Patented Jan. 5, 1943

2,307,130

UNITED STATES PATENT OFFICE 2,307,130

PROCESS FOR DEWAXING HYDROCARBONS

Robert W. Henry, Bartlesville, and James V. Montgomery, Okmulgee, Okla., assignors to Phillips Petroleum Company, a corporation of Delaware Application March 25, 1940, Serial No. 325,844

8 Claims. (Cl. 196—18)

This invention relates to an improved process for dewaxing lubricating oils. More specifically, it relates to a process of solvent dewaxing of lubricating stocks and deoiling the separated wax. This invention is a continuation-in-part of our co-pending application, Serial No. 218,652, which describes a method of improving separation of asphaltic bodies from mineral oils.

It is well known that solidified wax may be separated from an oil solution in a suitable solvent by cold settling, centrifuging, filtration, electrical precipitation, etc. But, the wax so separated contains adhering oil which reduces the yield of dewaxed oil as well as lowering the quality of the removed wax, unless the wax contaminated with oil is subjected to exhaustive washing and filtration in separate steps, or is diluted with additional solvent, recrystallized by chilling the solution, and centrifuged, filtered or cold-settled a second time.

We have found that efficient separation of wax from oil, together with removal of contaminating oil from the separated wax, may be obtained by the combined use of a suitable dewaxing solvent, such as liquid propane or liquid butane, light naphthas, acetone, or mixtures of acetone with naphthas, liquid propane, liquid butane, or similar known dewaxing solvents, and one or more of a group of gases, such as methane, ethane, hydrogen, carbon dioxide, nitrogen, ammonia, etc. These latter gases are substantially chemically inert to both the solvent and the mineral oil being treated, and are substantially soluble in the solvent used and substantially insoluble in the mineral oil being treated, especially at normal dewaxing temperatures, such gases acting as a precipitant for the oily and waxy material dissolved in the solvent.

The wax containing oil is dissolved in a suitable solvent, such as for example propane, or other similar known dewaxing solvent, in any suitable mixer. This solution of waxy oil in solvent is then chilled to the necessary temperature to give the desired pour point on the dewaxed oil and is transferred into a vertical settler or column near its mid-section. In this tower the chilled solution is mixed with an ascending oil-solvent solution and a descending stream of waxy particles. A refluxing action is obtained in the column by the introduction near its top of a cold precipitant gas, such as methane, ethane, hydrogen, carbon dioxide, nitrogen, ammonia, etc. or mixtures of two or more of said gases, under pressure. The oil and especially the more waxy constituents in the oil are less soluble in the solvent containing dissolved gas than in the solvent free from the dissolved gas, thus this gas in the solvent then causes a preferential or selective and continuous precipitation of the more waxy portion of the oil-solvent solution in the upper region of the apparatus. The waxy particles containing oil formed by this aforementioned continuous precipitation settle downward through the tower and are washed by the ascending stream of oil-solvent mixture by which action the oily portion of the particles is selectively dissolved out. As the resulting more waxy particles continue their downward settling they are contacted and washed by progressively nearer pure chilled solvent which is charged into the apparatus near its bottom. From the bottom of the apparatus is drawn a mixture of essentially pure wax and solvent and from the top thereof is taken a solution of oil of definite pour point and solvent. The solvent is removed from these two products by essentially any suitable method, taking into consideration the properties of the solvent.

The precipitation of the waxy impurities from the propane solution by precipitant gas or gases is effected by the principle of difference in solubilities of the various components in one another. The precipitant gas is substantially soluble in propane and substantially insoluble in the mineral oil undergoing treatment, particularly, the waxy impurities contained therein. When the precipitant gas under pressure, is introduced into the solution of oil and propane, the precipitant gas dilutes the propane solution, and by its presence decreases the solubility of the waxy impurities and finally precipitates the impurities and the more waxy portion of the oil from solution, leaving as solution, the precipitant gas, propane and the more desirable portions of oil.

The above mentioned waxy precipitated product settles downward and is continuously washed of its oil content by the ascending stream of oil and solvent. This solvent solution increases in solvent content to essentially pure solvent at the bottom of the apparatus, and the waxy particles are well stripped of their oil content by contact with this increasingly more nearly pure solvent.

By such combined washing action of the oily wax at the bottom of the tower and refluxing of the more waxy oil at the top thereof, greatly improved efficiency of the separation of wax from oil is obtained, the oil being prevented from escaping with the wax and the wax being prevented from escaping with the oil-solvent solution. The sharpness of separation is controlled with the amount of reflux material, the length of the apparatus, the efficiency of mixing, the temperature and pressure maintained in the apparatus, and the particular solvent and precipitant gas used. The method of stripping the solvent from the oil and wax products, and of separating the gas from the recovered solvent will vary somewhat with the solvent and with the type of apparatus used.

Our process finds application in the production of lubricating oils and especially in conjunction with crudes like Mid-Continent in which there is a considerable quantity of wax. However, our process is not restricted to the production of lubricating oil, as it may be employed in conjunction with any oil where it is desirable to obtain a separation of oil from waxy components.

Although propane is described as the solvent in the preferred embodiment of the present invention, it will be understood that any material having a preferential solvent action relative to the paraffinic constituents of the oil can be used, and any desirable method of separating and re-using the solvent employed. By the terms "paraffin and wax" the applicants intend to include that wax-like, non-asphaltic material which separates from crude or other mineral oils by cooling. The drawings show the treating zone in the form of a tower and it is so described herein, but it will be obvious that the applicants' process does not depend upon any particular form of apparatus.

Also, in the discussion of our invention, methane will be used as an example of a precipitant gas, but other gases as described herein can be successfully employed.

It is, therefore, an object of our invention to separate paraffin and other waxy materials from paraffinic oils.

Another object of our invention is to effect a sharp separation of waxy materials from paraffinic oils.

Still a further object is to treat mineral oil containing paraffinic components with a solvent in a treating zone to separate the paraffinic material from the oil with the aid of refrigeration and of reflux oil flowing counter-current to, and being continually washed by solvent; the reflux oil being precipitated from the solvent in the treating zone by means of a gaseous precipitant.

Other objects and advantages of our invention will be apparent from the following description, taken in conjunction with the drawings which illustrate diagrammatic forms of apparatus for successfully practicing our invention.

*Example I*

Figure 1:
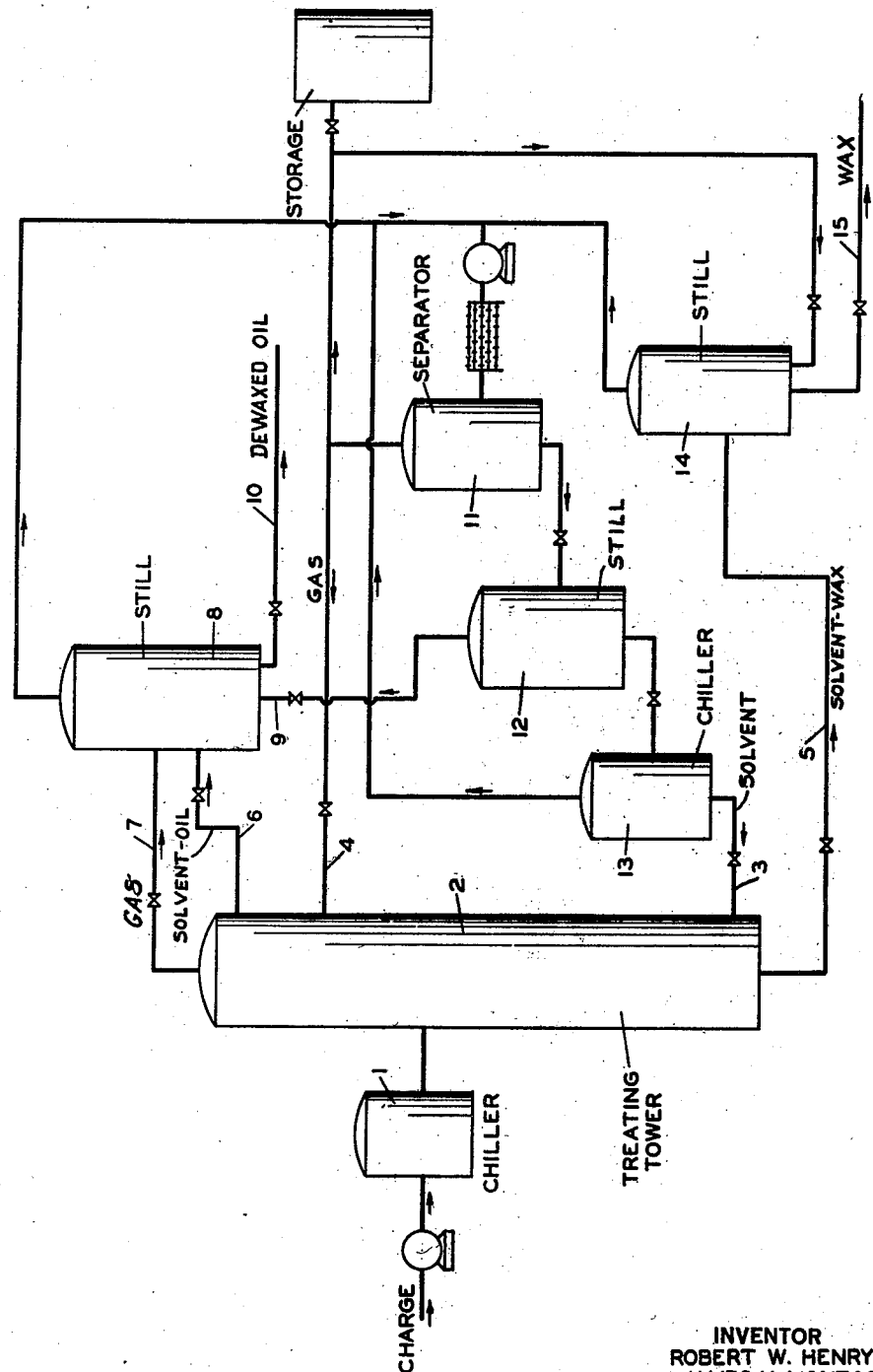
Figure 1 illustrates an apparatus suitable for use in our process in which the solvent has a lower specific gravity than the oil.

Referring to Figure 1, waxy oil is dissolved in a suitable solvent of low specific gravity, as propane, in a mixing device not shown. The mixture of oil and propane is refrigerated to the necessary temperature to give the desired pour-point of the dewaxed oil in chiller 1, which may be of any known type, and is then introduced into column 2 containing an ascending flow of oil-solvent solution and a descending stream of wax particles. In this column washing of adhering oil from the descending wax particles is obtained by upward flowing of additional solvent introduced near the bottom of the tower through line 3.

The wax particles contact progressively purer solvent as they near the bottom, and are progressively freed of oil thereby. Refluxing action in the column is obtained by the introduction of cold methane gas near the top of column 2 through line 4. The oil, especially the more waxy portion of the oils, is less soluble in the solvent containing the dissolved methane gas than in solvent free from the dissolved gas. Thus, this dissolved gas causes a continuous and selective precipitation of the more waxy portion of the oil dissolved in the solvent in this upper section of the tower. The precipitated droplets settle downward through the ascending flow of solvent oil solution, and the oil is selectively re-dissolved therein. Such precipitation of the less soluble waxy portion of the oil gives an effect analogous to the refluxing action in a fractionating tower, and improves separation of the waxy constituents from the oil. By such combined washing action at the bottom of the tower and "refluxing" of the more waxy oil at the top thereof, greatly improved efficiency of separation of wax from oil is obtained in a convenient manner, oil being prevented from escaping with the wax at the tower bottom, and the wax being prevented from escaping with the oil solution from the top of the tower.

The method of stripping the solvent from the oil and wax products, and separating the gas from the recovered solvent, will vary somewhat with the solvent used. The Figure 1 shows a method of such stripping and recovery when propane, or similar normally gaseous solvent is used. Wax-free oil solution and gas enter stripping still 8 where the solvent is distilled from the oil, with or without the aid of stripping gas from line 9, and the dewaxed oil leaves the apparatus through line 10. Gas and solvent vapors are compressed and cooled, and the gas separated from the condensed solvent in separator 11. Whence the gas is reintroduced into the tower through line 4 for precipitation of the waxy oil, or is used as a stripping aid. Washed wax from the bottom of the tower 2 is transferred through line 5 into stripping still 14 in which the solvent is removed from the wax, with the wax passing through line 15 to storage, not shown. The solvent vapor from this stripper is cooled and combined with the solvent vapor and gas from the oil-solvent stripper still 8 in separator 11. The condensed solvent from separator 11 is stripped of dissolved gas in still 12, and the gas-free solvent is chilled in chiller 13 of any suitable type previous to reintroduction into tower through line 3.

*Example II*

In a second application of the proposed process the dewaxing solvent used has a higher specific gravity than the solidified wax. Such known solvents include aniline, benzol, carbon tetrachloride, chlorex, cresols, furfural, nitro-benzene, phenol, pyridine and its homologues, etc. and mixtures of these or other solvents such that the dewaxing solvent has complete solubility for oil at the desired low dewaxing temperature, and little or no solubility for wax at said temperature, and in which the specific gravity of the solution is higher than that of the solid wax. In this application the oil to be dewaxed and the solvent are mixed in a mixer of conventional design not shown, chilled to the dewaxing temperature in chiller 20, see Figure 2, and pumped into tower 21 approximately midway of its length. By downward flow of additional solvent introduced into tower 21 through line 22, the wax particles contact progressively purer solvent as they near the top, and the wax substantially free from oil is washed from the tower 21 through line 24 into still 33 in which solvent and wax are separated. The solvent vapors leave still 33 through line 35, are cooled and passed into separator 30, while the wax passes through line 34 to storage, not shown.

Methane gas is introduced through line 23 into the bottom of tower 21 and dissolves in the solvent-oil mixture therein. This dissolved methane causes precipitation or separation of the waxy constituents from the solution thereby effecting a refluxing action as previously described. It is advantageous that the amount of methane introduced into the bottom of tower 21 be limited in amount, such that only downward flowing solvent at the bottom of the tower be substantially saturated with the precipitant gas and the solvent higher in the tower contains minimum dissolved gas; in this way positive refluxing action is obtained. This combined washing and refluxing of the more waxy portion of the oil results in a convenient and efficient separation of solidified wax from oil-solvent solution similar to that described in the previous example or application of the process.

Referring again to Figure 2, the solvent and dewaxed oil leave tower 21 by line 25 passing to still 27 where the solvent is stripped from the dewaxed oil, the oil leaving through line 29 and thence to storage, not shown, and the solvent vapors passing overhead, and through the cooler 31 and entering still 30. From this still 30, the methane passes overhead through a compressor 32, chiller 36 and into the tower through line 23, or passes into still 33 as a stripping gas. The separated solvent from still 30 is chilled at 37 and reenters the system through line 22.

In either of the above applications, it is advantageous to so chill the waxy oil-solvent mixture preliminary to introduction into tower 21, that the wax crystals will be small, since small crystals will contain minimum occluded oil and will be easier to wash free from said contaminating oil.

It is obvious that this process can be applied in progressive stages, and an increasingly higher melting point wax and lower pour-point oil being taken from successive stages.

The temperature of the oil-solvent solution in the tower may be maintained constant or a temperature gradient may be maintained between the bottom and the top of the tower, or between the bottom of the first tower and the top of the last of a succession of towers in series.

Figure 2:
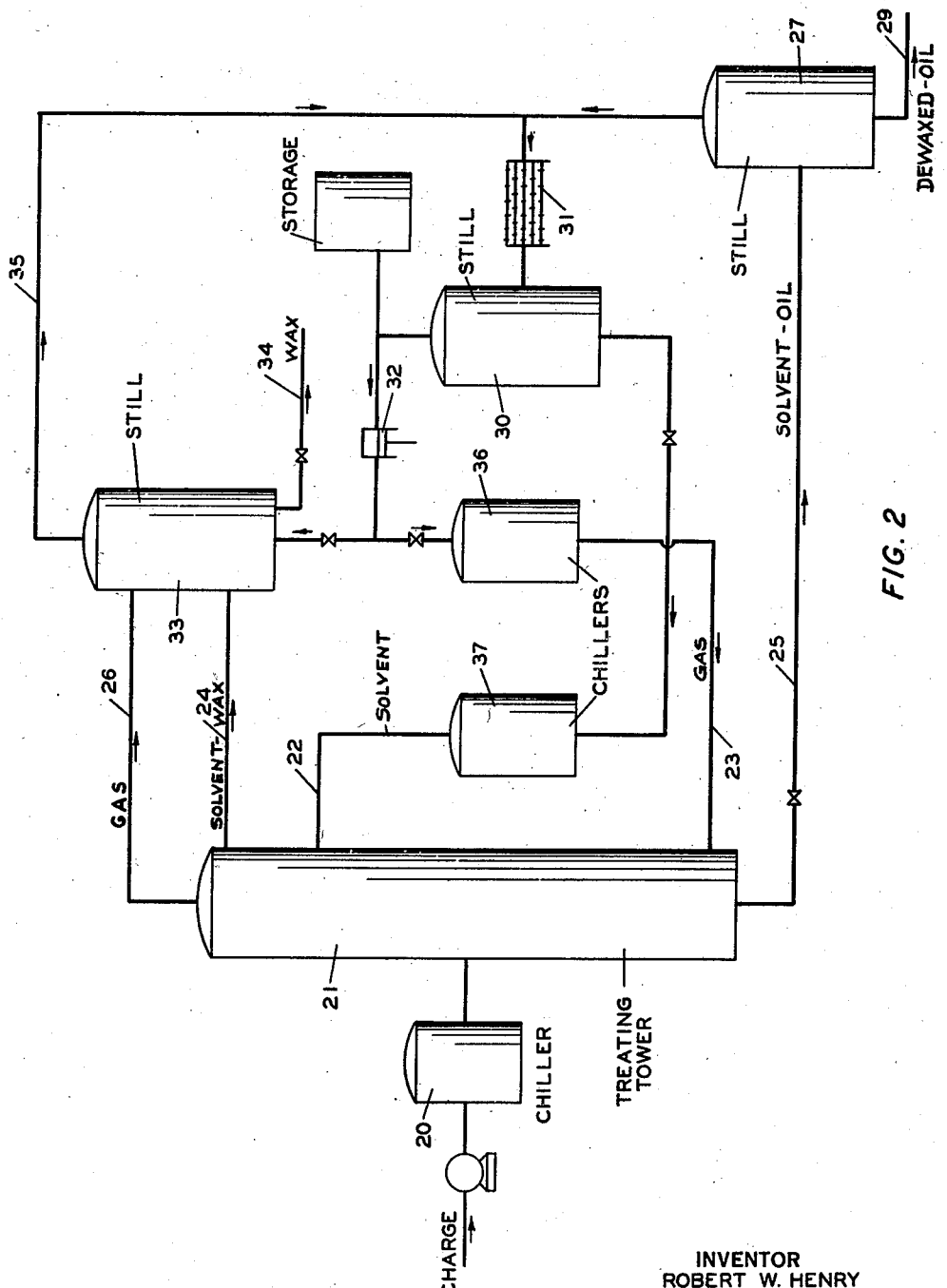
Figure 2 illustrates an apparatus suitable for use in our process in which the solvent has a higher specific gravity than the oil.

The relative positions at which lines from the chillers 1 or 20, in both Figures 1 and 2, enter respectively towers 2 and 21, are selected from optimum operation, and may be at or near the point at which the composition of the oil present in the two phases has characteristics similar to those of the entering oil.

It is to be understood that the above is merely illustrative of the principles and preferred embodiments of our improved invention of which many variations may be made by those skilled in the art without departing from the spirit thereof.

We claim:

1. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil-solvent mixture at a point adjacent the outlet of the refluxing section an inert gas, said inert gas completely dissolving in the oil-solvent mixture and causing additional wax precipitation as reflux wax, causing said reflux wax to flow by gravity in a direction countercurrent to the flow of the solvent-oil mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section.

2. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil-solvent mixture at a point adjacent the outlet of the refluxing section an inert gas, said inert gas comprising a gaseous hydrocarbon having a normal boiling point below −40° F. and completely dissolving in the oil-solvent mixture and causing additional wax precipitation as reflux wax, causing said reflux wax to flow by gravity in a direction countercurrent to the flow of the solvent-oil mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section.

3. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil-solvent mixture at a point adjacent the outlet of the refluxing section an inert gas, said inert gas completely dissolving in the oil-solvent mixture and causing additional wax precipitation as reflux wax, causing said reflux wax to flow by gravity in a direction countercurrent to the flow of the solvent-oil mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section; and separating solvent from the washed waxes, separating solvent and separating the inert gas from the solvent-dewaxed oil-dissolved gas mixture, combining the solvent from the washed waxes and the solvent from the dewaxed oil, and recycling this combined solvent and the separated inert gas.

4. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil-solvent mixture at a point adjacent the outlet of the refluxing section an inert gas, said inert gas comprising a gaseous hydrocarbon having a normal boiling point below −40° F. and completely dissolving in the oil-solvent mixture and causing additional wax precipitation as reflux wax, causing said reflux wax to flow by gravity in a direction countercurrent to the flow of the solvent-oil mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section; and separating solvent from the washed waxes, separating solvent and separating the inert gas from the solvent-dewaxed oil-dissolved gas mixture, combining the solvent from the washed waxes and the solvent from the dewaxed oil, and recycling this combined solvent and the separated inert gas.

5. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil-solvent mixture at a point adjacent the outlet of the refluxing section an inert gas, said inert gas comprising ammonia and completely dissolving in the oil-solvent mixture and causing additional wax precipitation as reflux wax, causing said reflux wax to flow by gravity in a direction countercurrent to the flow of the solvent-oil mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section.

6. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil-solvent mixture at a point adjacent the outlet of the refluxing section an inert gas, said inert gas comprising ammonia and completely dissolving in the oil-solvent mixture and causing additional wax precipitation as reflux wax, causing said reflux wax to flow by gravity in a direction countercurrent to the flow of the solvent-oil-mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section; and separating solvent from the washed waxes, separating solvent and separating the inert gas from the solvent-dewaxed oil-dissolved gas mixture, combining the solvent from the washed waxes and the solvent from the dewaxed oil, and recycling this combined solvent and the separated inert gas.

7. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil-solvent mixture at a point adjacent the outlet of the refluxing section an inert gas, said inert gas comprising carbon dioxide and completely dissolving in the oil-solvent mixture and causing additional wax precipitation as reflux wax, causing said reflux wax to flow by gravity in a direction countercurrent to the flow of the solvent-oil mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section.

8. The continuous process of dewaxing mineral oils comprising the steps of mixing the waxy oil with a dewaxing solvent, chilling the mixture to precipitate the wax, introducing the wax-oil-solvent mixture into a separating zone comprising washing and refluxing sections, at a point intermediate the washing section and the refluxing section, passing a stream of chilled wash solvent through said separating zone from the inlet end of the washing section to the outlet end of the refluxing section, selectively dissolving in the stream of chilled wash solvent the oil and solvent from the precipitated wax-oil-solvent mixture; entering into the oil solvent mixture at a point adjacent the outlet of the refluxing section an inert gas, said inert gas comprising carbon dioxide and completely dissolving in the oil-solvent mixture and causing additional wax precipitation as reflux wax, causing said reflux wax to flow by gravity in a direction countercurrent to the flow of the solvent-oil mixture and be washed thereby, combining said reflux wax and the precipitated wax from the chilled wax-oil-solvent mixture at the intermediate point of the washing and refluxing zones, causing the combined waxes to flow by gravity in a direction countercurrent to the flow of chilled wash solvent and washing said combined waxes with progressively purer wash solvent; and removing the washed waxes at the chilled solvent inlet end of said washing section; and removing the solvent-dewaxed oil-dissolved gas mixture at the solvent outlet end of said refluxing section; and separating solvent from the washed waxes, separating solvent and separating the inert gas from the solvent-dewaxed oil-dissolved gas mixture, combining the solvent from the washed waxes and the solvent from the dewaxed oil, and recycling this combined solvent and the separated inert gas.

ROBERT W. HENRY.
JAMES V. MONTGOMERY.